United States Patent [19]

Butwell et al.

[11] 4,184,855
[45] Jan. 22, 1980

[54] PROCESS FOR CO₂ REMOVAL

[75] Inventors: Kenneth F. Butwell, Newburgh; Daniel J. Kubek, Greenburgh, both of N.Y.

[73] Assignee: Union Carbide Corporation, New York, N.Y.

[21] Appl. No.: 865,732

[22] Filed: Dec. 29, 1977

[51] Int. Cl.² .......................................... B01D 53/16
[52] U.S. Cl. ........................................... 55/48; 55/49; 55/73; 423/229
[58] Field of Search ................... 55/48, 49, 68, 73, 89; 423/228, 229

[56] References Cited

U.S. PATENT DOCUMENTS

| | | | |
|---|---|---|---|
| 2,445,468 | 7/1948 | Blohm et al. | 423/228 |
| 2,477,314 | 7/1949 | Scharmann | 423/229 X |
| 3,233,388 | 2/1966 | Karwat et al. | 55/49 X |
| 3,242,644 | 3/1966 | Woertz | 55/48 |
| 3,808,140 | 4/1974 | Mago et al. | 423/229 X |
| 3,961,015 | 6/1976 | Dailey | 423/229 |

FOREIGN PATENT DOCUMENTS 1244176  8/1971  United Kingdom .................... 423/229

OTHER PUBLICATIONS

Brennan, *Amine Treating of Sour Gas: Good Riddance to H₂S*, Chem. Eng., vol. 69, No. 22, 10/29/62, pp. 94–96.

*Primary Examiner*—Robert H. Spitzer
*Attorney, Agent, or Firm*—Dominic J. Terminello

[57] ABSTRACT

A continuous process for acid gas removal from process gas streams by contact with an aqueous alkanolamine solution such as MEA wherein the temperature of the MEA solution is controlled by placing an intercooler at the lower end of the absorption column such that the temperature of the down-coming MEA solution is cooled to allow increased mole loading of acid gas in the solution, but is not so cooled that the mass transfer rate of the acid gas from the process gas to the MEA solution is slowed to an unacceptable level. The lower temperature highly loaded MEA solution is then passed to a heat exchanger-flash-heat exchanger arrangement where the temperature is increased to provide satisfactory flash efficiency and then heated again prior to introduction into the stripper to reduce the sensible heat duty in the stripper. The combination of optimally positioned intercooler and flash together with the temperature ranges recited permit the obtainment of a net energy demand lower than can be expected from the addition of the intercooler effect and the flash effect.

11 Claims, 2 Drawing Figures

PROCESS FOR CO₂ REMOVAL

This invention relates to a process for acid gas removal and more particularly, $CO_2$ gas removal from various process gases.

The removal of acid gases by countercurrent absorption with alkanolamines has been known in the industry for over forty years. Around 1969, a corrosion inhibition system was discovered and later patented in U.S. Pat. No. 3,808,140, Apr. 30, 1974, which eliminated many conventional MEA-$CO_2$ removal design and operating constraints. Since that time, work has been continuously carried on to improve and optimize the MEA-$CO_2$ corrosion inhibited system in terms of lower capital expenditures, i.e., reduction in the number of pieces and size of required apparatus and in terms of lower energy requirements to practice the process.

An object of this invention is to provide an improved process for acid gas removal wherein the need for heating and cooling from external sources is minimized.

Another object is to provide an improved corrosion inhibited process for acid gas removal.

Other objects will become apparent from the following description and drawings wherein FIG. 1 is a schematic flow diagram of an illustrative embodiment of the present invention; and FIG. 2 is a plot of percent $CO_2$ flashing vs. temperature and loading.

In a broad aspect of the invention, the acid rich amine scrubbing solution is cooled near the middle to bottom of the absorption column to reduce the temperature-controlled partial pressure of the absorbed acid gas, thereby permitting higher loading than would otherwise be possible. (For purposes of simplifying the disclosure, reference will usually be made to $CO_2$ as the acid gas. The invention is not necessarily so limited as will be described hereafter.) In combination with the cooling of the rich solution, a rich solution flash is used to thereby achieve heretofore unattainably low reboiler duty.

Energy required to desorb $CO_2$ from the loaded solvent is provided in the stripping column of an amine type $CO_2$ removal plant. In conventional non-inhibited $CO_2$ removal MEA systems the steam requirement to provide this energy was typically 95,000 Btu/lbs. mole $CO_2$. Corrosion inhibited systems as described in U.S. Pat. No. 3,808,140 has greatly reduced this requirement. The present invention reduces still further the need for heating and cooling from external sources. It is known that the less $CO_2$ load in the stripping column, the lower the heat duty which must be supplied and, furthermore, the smaller diameter stripping column that is required. Herein lies the basis for using in this invention a flash tank for $CO_2$ removal prior to actual stripping. The more $CO_2$ removed externally to the stripper by taking advantage of the high rich amine loading leaving the contactor (because of the cooling of the MEA solution) designed at close to equilibrium conditions, by flashing to near atmospheric pressure, the smaller regeneration heat duties are required. Part of the stripping then is achieved "for free" utility-wise. Conceptually the flash tank can be placed anywhere in the rich solvent line between the contactor and stripper, but further consideration indicates that little is to be gained from an improperly placed and designed flash. This has a good deal to do with the thermodynamics of the system. As $CO_2$ and $H_2O$ is flashed from a high-pressure stream, the heat required to achieve vaporization is consumed from the liquid phase as thermal energy. Therefore, if a flash is located contiguous to the stripper inlet, the sensible duty of the column is increased due to reduced inlet temperature; any positive advantage gained via reduced $CO_2$ load is offset by the negative sensible heat effect. There is a need, then, to reheat the flash bottoms (via heat exchange) prior to stripping. One might then suggest placement directly downstream of the contactor rich solvent draw-off, prior to lean/rich exchange, for here, adequate heating could be obtained after flashing. This, again, is unsatisfactory, but for a different reason. Essentially, the higher the inlet temperature to the flash, the better the flash efficiency obtained in terms of $CO_2$ removal (see FIG. 2). The flash efficiency is defined as percent of total $CO_2$ removal, based upon the amount of $CO_2$ contained in rich solution. Loading, furthermore, plays an important role. At 180° F., for example, less than 4 percent of the $CO_2$ can be removed by flashing from a 0.50 m/m loading; almost 13 percent can be removed from 0.58 m/m.

In the present invention, we seek to increase the rich loading exiting the contactor from a presently normal value of approximately 0.50 m/m. This can be accomplished by designing tightly for a very close equilibrium loading approach on the bottom trays while utilizing an intercooler on one of the bottom trays to cool the semi-contacted amine. This cooling lowers the partial pressure of $CO_2$ in the amine, increasing the mass transfer driving force for $CO_2$, thereby allowing the loading to rise still further through contacting on the remaining bottommost trays. However, because of the lower temperatures of the rich solution leaving the contactor, the flash unit operation must be between HX-1 and HX-2 (see FIG. 1) for in this way we can provide a reasonable pre-flash temperature while retaining the capability to reheat the solution after flashing prior to further stripping.

DESCRIPTION OF EMBODIMENT OF THE INVENTION

Figure 1:
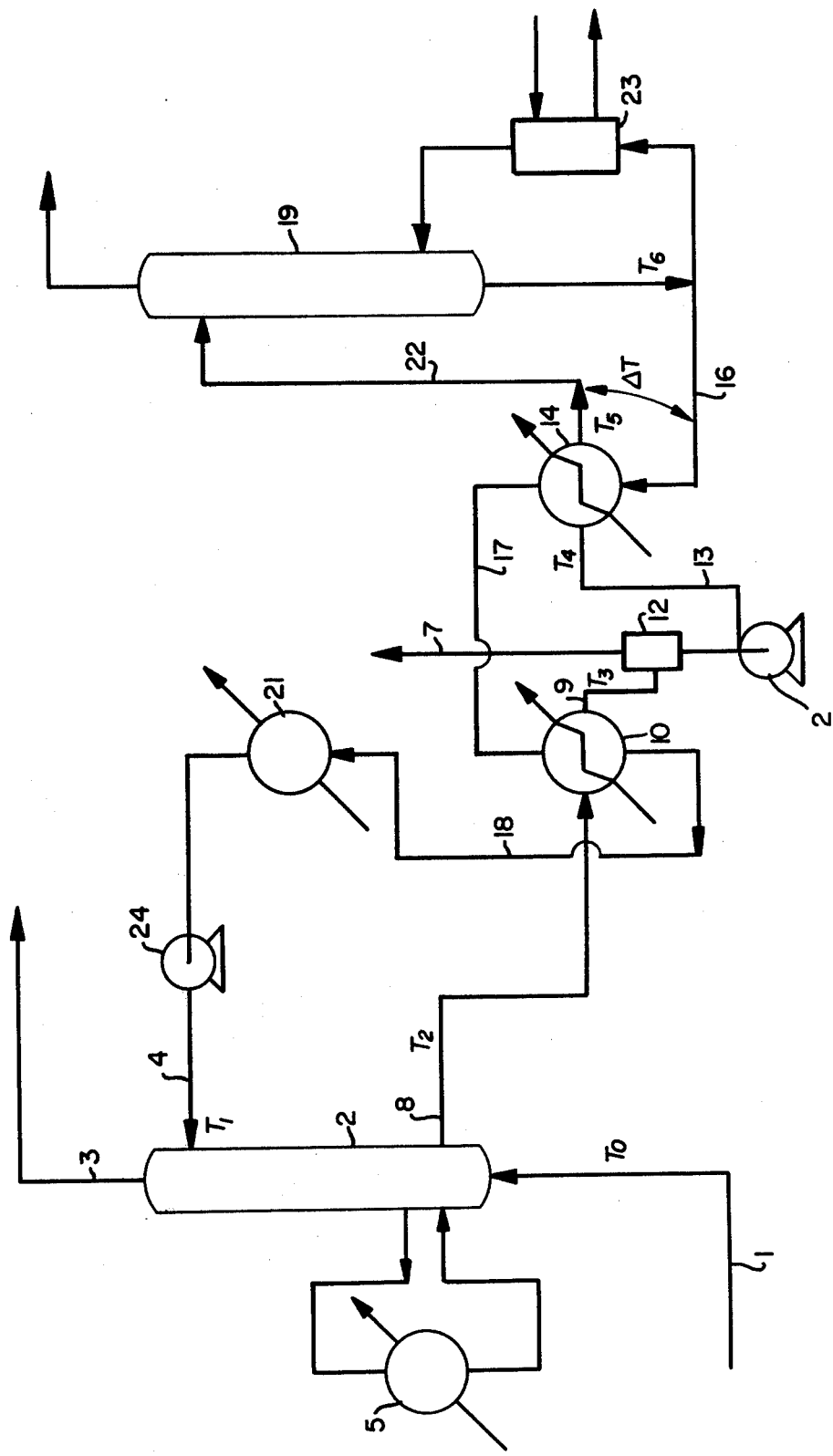

As noted, the feed gas is a mixture of process gas and acid gas, the process gas being selected from the group consisting of a hydrocarbon, a mixture of hydrocarbons, synthesis gas, and a mixture of nitrogen and hydrogen. Examples of hydrocarbons that are processed in the system are ethane and methane which may be in the form of natural gas or substitute or synthetic natural gas (SNG), ethylene, ethane, propylene, propane, mixtures of such hydrocarbons, and the prepurified effluents from the cracking of naphtha or crude oil or from coal gasification. The synthesis gas refers to mixtures of hydrogen and carbon monoxide in varying proportions generally in the range of about 60 to about 80 percent by volume hydrogen and about 0.1 to about 20 percent by volume carbon monoxide with the balance, if any, being carbon dioxide. The percent is based on the total volume of the synthesis gas. Typical mixtures are $H_2$ 77.7%, CO 0.3%, and $CO_2$ 22.0% and $H_2$ 70%, CO 15% and $CO_2$ 15%. The mixture of nitrogen and hydrogen is used in the manufacture of ammonia. Generally, the mixture contains about 20 percent by volume nitrogen and about 60 percent by volume hydrogen based on the total volume of the mixture of nitrogen and hydrogen.

The feed gas also contains an acid gas selected from the group consisting of carbon dioxide, hydrogen sulfide, and mixtures thereof in amounts of about 5 to about 60 percent by volume based on the total volume of the feed gas. The "total volume of the feed gas" is inclusive of process gas as defined and acid gas as defined, but exclusive of water vapor and the impurities discussed below. The amount of acid gas usually contained in the feed gas is in the range of about 15 to about 30 percent by volume.

Water can be and is usually present in mixture with all of the process gas components in the form of water vapor or droplets in amounts running from 0 to saturated and is preferably saturated. Saturation minimizes water evaporation in the bottom of the absorption zone. An anhydrous feed gas may be used but is very rare.

The impurities as defined herein are represented by (a) any gas not defined above as a process gas, acid gas, or water vapor, and (b) solid particles or liquid droplets (exclusive of water droplets) in the feed gas. They can be present in amounts of up to about 3 weight percent based on the total weight of the feed gas and are preferably present in amounts no greater than about 1 weight percent and, in many cases, lower than 0.01 percent. Examples of the gaseous impurities are sulfur dioxide, carbonyl sulfide, and carbon disulfide. Examples of the solid or liquid impurities are iron sulfide, iron oxide, high molecular weight hydrocarbons, and polymers. Any olefins having more than one double bond, triple bond hydrocarbons and, as a general rule, any material that will polymerize or react in situ is an undesirable impurity.

The absorbent is a solution of an alkanolamine having 1 to 3 alkanol radicals, each alkanol radical having 1 to 3 carbon atoms, and water. Examples of the alkanolamines are monoethanolamine (MEA), diethanolamine (DEA), and triethanolamine (TEA), MEA being the absorbent of choice. Other suitable alkanolamines are diisopropanolamine, monoisopropanolamine, monopropanolamine, dipropanolamine, tripropanolamine, and triisopropanolamine. Although mixtures of alkanolamines can be used, they are not preferred. Mixtures of amines and inert inorganic or organic compounds that have a high solubility for contaminates to be removed, can be used. Such compounds can be substituted for water. For example, a treating solution such as glycolamine-water, as described by Hutchinson in U.S. Pat. No. 2,177,068 can be used.

The aqueous MEA solution introduced into the system is generally from about 15 percent to about 70 percent by weight MEA based on the weight of the solution. Where DEA is used, the broad range in initial solution is about 25 percent to about 90 percent by weight, and where TEA is used, the broad range is about 40 percent to about 95 percent by weight. Examples of typical solutions in percent by weight, which can be used in this system, are as follows:

MEA: 35% water 65%
DEA: 50% water 50%
TEA: 70% water 30%

It is preferred that the system be essentially corrosion-free. Otherwise, the advantages effected by the subject process will be negated in a commercial application by the loss of production due simply to the down-time caused by corroded apparatus. This can be achieved in a carbon dioxide system, for example, by using the corrosion inhibitors described in the claims of U.S. Pat. No. 3,808,140 or using apparatus made from various titanium alloys, or various corrosion resistant stainless or carbon steels, or by using glass-lined apparatus. In any case, it is suggested that some anti-corrosion system be used in a carbon dioxide system. In using the antimony and vanadium compounds of U.S. Pat. No. 3,808,140, the respective compounds are mixed together such that there is a ratio of from about 1 to 9 parts by weight, of antimony compound to about 9 to about 1 part by weight of vanadium compound. The preferred ratios are from about 4–6 parts to about 6–4 parts with equal parts being most preferred. The combination of antimony and vanadium compounds is added in an amount from about 0.01 to about 2.0 percent by weight based on the weight of the aqueous alkanolamine solutions including the weight of the water and the alkanolamine.

The apparatus used in the process of absorption, stripping and cooling as well as reboilers, filters, piping, turbines, pumps, flash tanks, etc. are of conventional design. A typical absorption column used in the system can be described as a sieve tray contactor with 15 to 35 sieve trays having a tray spacing of 0.6 meter or its equivalent in packing. A typical distillation column used in the system can be described as a sieve tray tower having 15 to 20 actual trays or its equivalent in packing. The still contains in its base, or in an external kettle, a tubular heating element or reboiler and at the top of and external to the still are condensers and a water separator (not shown in the drawing).

REFERRING TO THE DRAWING

The feed gas is introduced at line 1 into the absorber 2 (contactor) at or near the bottom tray, the feed gas absorber inlet temperature ($T_0$) usually being in the range of about 140° F. to about 190° F. However, to enhance mass transfer temperature of gas coming into contact with the solution should be preferably about 5° F. above temperature of the exiting solution in order to prevent evaporation of water from solution to gas. Evaporation causes an evaporative film to occur which inhibits good mass transfer from gas to liquid. Accordingly, good mass transfer decreases. The feed gas flows upwardly through the absorber to countercurrently meet the aqueous alkanolamine solution referred to as lean solution, which is introduced at or near the top tray of absorber 2 through line 4.

The pressure in absorber 2 can be in the range of about 14.7 psia to about 1500 psia and is usually in the range of about 250 psia to about 800 psia.

The lean solution enters absorber 2 at a temperature ($T_1$) in the range of about 105° F. to about 162° F. and is usually about 105° F. to 125° F.

The feed gas, which has had the bulk of its acid gas absorbed, passes up the absorber column and exits as vent gas through line 3 at a temperature in the range of about 105° C. to about 162° F. and is usually about 105° to 125° F. The vent gas (or process gas) may contain up to about 18,000 ppm of acid gas, the objective, of course, being to meet the specification requirements for the process gas, which are sometimes as low as 5 ppm of acid gas. The present process can meet these broad requirements without difficulty.

After the lean solution absorbs all but the small fraction of acid gas referred to above, it is referred to as rich solution, i.e., a mixture of lean solution, absorbed acid gas, additional water picked up from the feed gas, and some impurities. The "rich solution loading," which is the ratio of moles of acid gas to moles of alkanolamine in the rich solution is in the range of about 0.1 to about 1.0 and is usually about 0.50 to about 0.67. When the acid gas containing solutions reaches a temperature in the range of approximately 135°–185° F., preferably about 155° F., the solution is passed through a cooling zone 5 to lower the temperature of the solution and then the cooled stream is passed through the absorption zone to increase the mole loading of acid gas in the solution such that the temperature $T_2$ of the rich solution leaving the absorption zone never exceeds 185° F. 135°–185° F. is the preferred range for absorption of $CO_2$ by MEA solutions. This is predicated on mass transfer which is a function of kinetics and driving force in the system. Above and below this temperature range, the mass transfer of $CO_2$ into the MEA solution is hindered. For example, temperatures below 135° F. cause a slower reaction rate because the kinetics of the system at lower temperatures are reduced. Temperatures above 185° F. effect the $CO_2$ driving force between $CO_2$ in the gas phase and absorbed $CO_2$. Hence, it is preferred to do the bulk of absorption in this temperature range. However, it is understood that the addition of mass transfer units (trays) in absorber columns allows one to operate at higher and lower absorption temperatures at an increased capital expense which, of course, is undesirable. The highly loaded rich solution exits absorber 2 at or near the bottom tray through line 8 at an absorber outlet temperature ($T_2$) in the range of about 135° to about 185° F. and normally is in the range of about 145° to about 155° F., preferably the rich solution absorber outlet temperature is lower than the inlet temperature of the feed gas.

Figure 2:
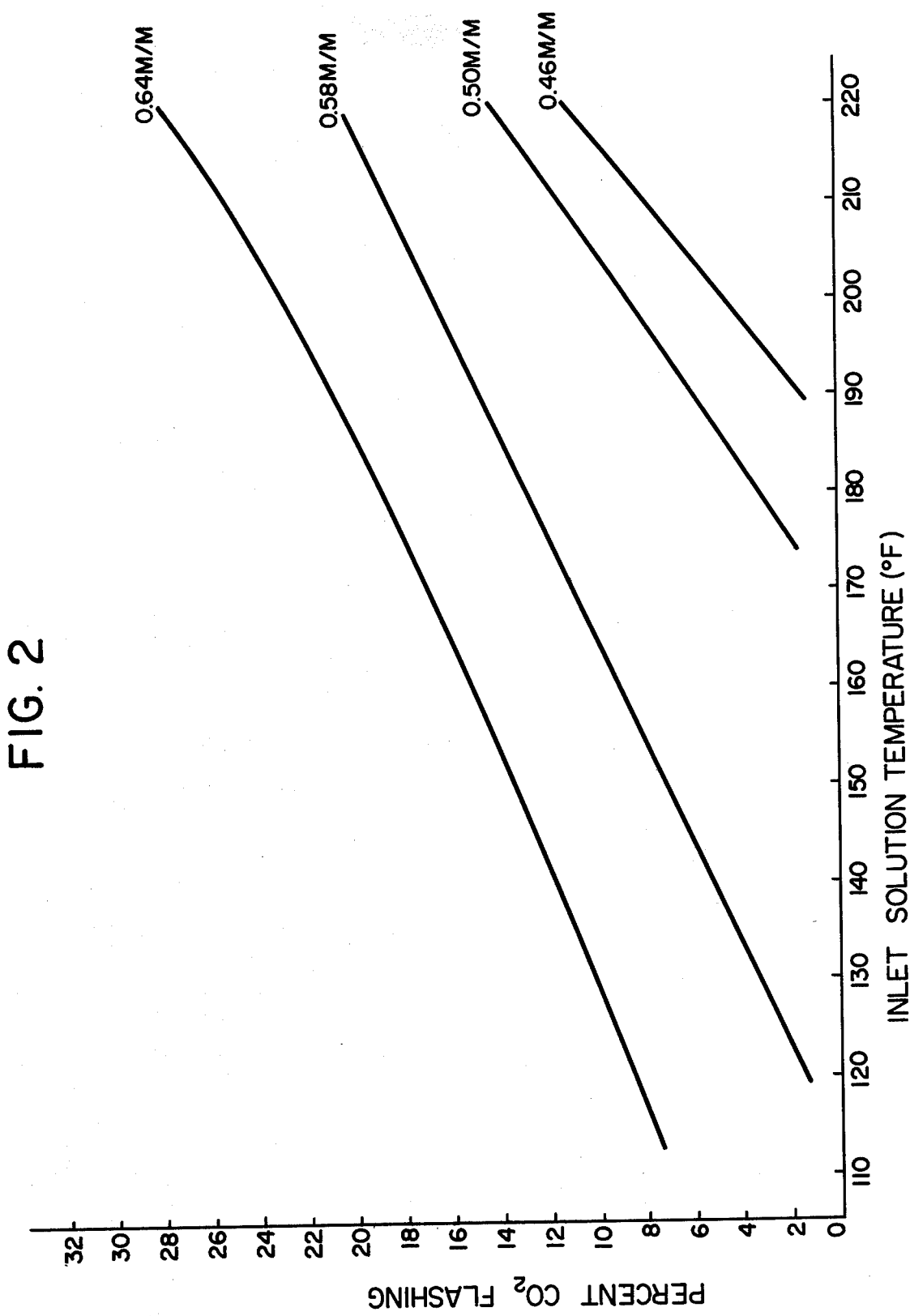

Rich solution passes from the bottom of the absorption column 2 to a first heat exchanger 10 where the rich solution passes in heat exchange relationship with a recycling regenerated alkanolamine solution to increase the temperature of the solution to temperature $T_3$. The heated rich solution is passed at temperatures in the range of from 170°–195° F. through line 9 to a flash vessel 12 where $CO_2$ is flashed through line 7 from the rich solution at pressures between 0 psia to 60 psia, preferably 7.5 to 16.7 psia. As stated above and as can be seen from FIG. 2, the amount of flashing is dependent on flash temperature and acid gas loading. The higher the temperature, the higher the flash and the higher the acid loading, the higher the flash. Flashing reduces the temperature of the stream leaving the flash tank 12 to temperature $T_4$ in the range of from 155°–180° F. Accordingly, the stream is pumped by pump 2 through line 13 to a second heat exchanger 14 where the temperature is increased to temperatures in the range of from 200° F. to 240° F. so as to minimize the heat duty from the reboilers 23 to strip the $CO_2$ from the solution. The solution is passed via line 22 to stripper 19. The lean solution leaves the stripper 19 at a temperature $T_6$ in the range of from 240° to 280° F. and is recycled to the heat exchangers 14 and 10 through lines 16 and 17 and then through line 18 to a lean solution cooler 21. The cooled lean solution then is introduced into the top of the contactor column 2 by pump 24 and the cycle repeated.

The advantages of the present invention are clearly brought out by the following specific examples and comparative data provided to aid those skilled in the art in the practice of the invention.

The concept of the invention is embodied in a system of the type described above with a 35 weight percent MEA solution as the absorbent. The inlet gas stream flow is 13,520 lb moles/hr, of which 2,400 lb moles/hr is $CO_2$, and it enters the contactor at a temperature of 150° F. The inlet gas stream is saturated with water; contacting pressure is 380 psig. To facilitate comparison of the present invention with the various other systems on an equivalent basis, the rich solvent stream loading approach to equilibrium was held constant at approximately 87 percent. The solution flow rate was 2,300 gpm and was introduced into the contactor at a temperature of 105° F. and a lean loading of 0.21 moles $CO_2$/mole amine. The partially $CO_2$ loaded MEA solution was passed through an intercooler 5 at a temperature of approximately 160° F. and then passed back through the contactor where the rich solution was increased to 0.56 moles $CO_2$/mole amine. The temperature of the solution leaving the contactor was 135° F. and the $CO_2$ in the vent gas was reduced to 100 ppm. The intercooler required 46.9 MM Btu/hr at a cooling water rate of 3,124 gpm to cool the partly loaded MEA solution.

The rich amine solution was passed to heat exchanger 10 at a temperature of 135° F. and exits at 176° F. The recycling lean amine solution entered at 188° F. and left at 148° F. The solution was then passed to the flash tank and flashed to 0.0 psig pressure. The rich solution temperature was reduced from 176° F. to 165° F. via the flash and 370 lb moles/hr of $CO_2$ were removed by flashing. The rich solution $CO_2$ content was thereby reduced from 3,840 to 3,470 lb moles/hr.

The solution was then passed at 165° F. to the second heat exchanger 14 where the rich amine solution was heated to 230° F. by recycling lean amine which entered at 250° F. and left at 188° F.

The rich solution was then passed to the stripper at 230° F. Here, 42.7 M Btu/lb mole $CO_2$ were required to strip the $CO_2$-rich amine stream from 3,470 to 1,440 lb moles $CO_2$/hr.

At this point, it is desirable to compare the subject invention process and other processing. Table I demonstrates several processing systems. Of primary importance is the energy/mole $CO_2$ requirement for each process, for here is indicated the actual utility input for processing. It must not be forgotten, however, that several of the alternatives may require increased capital investment to achieve reduced utility cost; these situations are described by a second index of comparison, the Operating Index, which is derived from an operating cost combining annual utility cost with a fixed annual amortization of capital investment for the particular scheme. The Operating Index is then referenced to the base prior art case of 1.0.

As one seeks to improve the basic prior art (Column 1) design for improved energy requirement, one may utilize the concept of flashing to reduce the $CO_2$ loading upon the stripping column. The effect is shown in Column 2. A primary difficulty with this alternative is that the rich loading is limited to 0.5 m/m by equilibrium consideration which limits the degree of flash obtainable (See FIG. 2). We can, furthermore, seek to reduce reaction and vaporization enthalpy demand of the stripping column by raising the lean solution loading from 0.15 to 0.21 m/m (Column 3). Unfortunately, potential benefit is dampened by the sensible heat demand increase accompanying high solution flow rate that follows increased lean loading when rich solution loading is fixed by equilibrium approach. As can be seen, then, we are able to obtain some improvement both in utility demand and in operating cost (from 55 M Btu/lb mole $CO_2$ and OI=1.0 to 46 M Btu/lb mole $CO_2$ and OI=0.94). A different road we could have followed would have been to attempt to raise rich loading by the use of an intercooler. That is, at lower rich temperature, we can accommodate higher rich loadings to achieve the same equilibrium approaches. The effect may be further enhanced by elevated lean loadings and, as a result, improved stripper thermodynamics. The results again demonstrate improvement (from 55 M Btu/lb mole $CO_2$ and $OI=1.0$ to 47.8 M Btu/lb mole $CO_2$ and $OI=0.93$) (Column 4). Quite significant improvement was obtained through judicious design incorporating aspects of both aforementioned paths. The desired design characteristics can be obtained only by consideration of the synergistic effect derived by such a combination. Flashing is desirable for its ability to reduce the $CO_2$ loading upon thermal stripping; thermodynamics of the flash operation dictate that flash efficiency is a function of inlet loading. Therefore, we desire as high flash inlet rich loadings as possible within the constraint of equilibrium. We cannot obtain the type of flash efficiency required for high utility economy with conventional loadings. Use of an intercooler helps to attain enhanced flash efficiency by reducing the ultimate equilibrium constraints, allowing higher absorber outlet loadings. The use of an intercooler is also most helpful in another important way. The use of increased lean loading in stripper design can only be fully beneficial if the sensible heat duty is not allowed to rise following increased solution flow rate. Through intercooling, we can, in addition, raise rich loadings to accomplish equivalent net loading and thereby reap the benefits of both improved stripper and absorber thermodynamic design. It is this interaction between each component of design that creates an optimum combination of effects contributing to a net energy demand for the combined system of this invention that is lower than any of the individual components taken separately. The object of this invention can only be achieved by optimal location of the intercooler and flash and careful selection of all design parameters to achieve a well-balanced system design. As can be seen from the data (Column 5), a greatly reduced stripping duty of 42.7 M Btu/lb mole $CO_2$ and Operating Index of 0.89 overall are obtained by the process of this invention. The reduction in stripping duty is reflected in marked utility cost savings (Utility Index 0.77). This large utility savings far outweighs the increased Capital Investment as reflected by the overall Operating Index of 0.87.

Having described the invention with respect to certain preferred embodiments, it should be understood that certain modifications may be made thereto without departing from the spirit and scope of the invention.

TABLE I

|  | Prior Art | Prior Art + Flash | Prior Art + Flash | Prior Art W/Intercooler | Invention Intercooler + Flash |
|---|---|---|---|---|---|
| Rich Loading | 0.50 | 0.50 | 0.50 | 0.56 | 0.56 |
| Lean Loading | 0.15 | 0.15 | 0.21 | 0.21 | 0.21 |
| Approach | 87.5% | 87.5% | 87.5% | 87.5% | 87.5% |
| M Btu/#Mole | 55.0 | 49.1 | 46.0 | 47.8 | 42.7 |
| Capital Investment (M$) | 4535 | 5593 | 5573 | 5523 | 6154 |
| Utility Cost (M$/Yr) | 3520 | 3159 | 2996 | 3028 | 2708 |
| Operating Cost (M$/Yr) | 4427 | 4278 | 4151 | 4133 | 3939 |
| Capital Index | 1.0 | 1.23 | 1.27 | 1.22 | 1.36 |
| Utility Index | 1.0 | 0.90 | 0.85 | 0.86 | 0.77 |
| Operating Index | 1.0 | 0.97 | 0.94 | 0.93 | 0.89 |

What is claimed is:

1. A continuous process for the removal of acid gases from a feed gas mixture by contacting the feed gas mixture with an aqueous alkanolamine solution, the alkanolamine having 1 to 3 alkanol radicals, each radical having 2 or 3 carbon atoms comprising
   (a) introducing into an absorption zone a feed gas mixture of process gas and acid gas comprising a process gas selected from the group consisting of a hydrocarbon, a mixture of hydrocarbons, synthesis gas and a mixture of nitrogen and hydrogen; and about 5 to about 60 percent by volume of an acid gas selected from the group consisting of carbon dioxide, hydrogen sulfide and mixtures thereof; wherein percent by volume is based on the total volume of the mixture of process gas and acid gas introduced into the absorption zone, at an absorption zone inlet temperature ($T_0$), for the feed gas mixture in the range of 140°–190° F.;
   (b) countercurrently contacting the feed gas mixture in the absorption zone with a mixture of an aqueous alkanolamine solution, said aqueous alkanolamine solution having a concentration of from 15–95 weight percent of the alkanolamine and a temperature ($T_i$) of from 105°–162° F. to absorb the acid gas from the feed gas mixture;
   (c) passing at least most of the downflowing acid gas containing alkanolamine solution through a cooling zone when the solution has reached a temperature of from 135°–185° F. to lower the temperature of the solution and then passing the cooled acid gas containing solution through the absorption zone to increase the mole leading of acid gas in the solution such that the temperature ($T_2$) of the rich solution leaving the absorption zone never exceeds 185° F.;
   (d) removing the acid gas rich solution having an acid gas loading of 0.50 m/m to 0.67 m/m from the bottom of the absorption zone and passing such solution in heat exchange relationship with a recycling regenerated alkanolamine solution to increase the temperature of the rich solution ($T_3$) in the range of from 170°–195° F.;
   (e) passing the heated rich solution from step (d) to a flash zone to remove more of the acid gas loading from the alkanolamine solution than if the stream were not heated such flashing reducing the temperature of the solution to temperature ($T_4$) in the range of from 155° to 180° F.;
   (f) passing the reduced acid gas containing stream from step (e) in heat exchange relationship with the recycling regenerated alkanolamine solution to increase the temperature to a temperature ($T_5$) in the range of from 200° to 240° F.;

(g) introducing the heated solution from step (f) into a stripping zone so that reduced sensible heat is required to be added to the system to strip acid gas from the solution;

(h) separating the mixture of acid gas and a minor proportion of water from the solution introduced to the stripper, the separated water being in the form of vapor and removing said mixture as overhead from the stripping zone;

(i) removing the balance of the solution from step (h) from the bottom of the stripping zone at a temperature ($T_6$) in the range of 240°–280° F.;

(j) passing the hot regenerated solution from step (i) in heat exchange relationship with the solutions in steps (d) and (f) and then to a cooling zone where the temperature ($T_1$) is reduced to 105°–162° F.;

(k) and then recycling the solution of step (j) to the absorption zone.

2. Process according to claim 1 wherein the alkanolamine is MEA.

3. Process according to claim 1 wherein the acid gas is $CO_2$.

4. Process according to claim 1 wherein the alkanolamine solution is an MEA solution having a concentration of between 15–70 wt.%.

5. Process according to claim 4 wherein the MEA concentration is 35 wt.%.

6. Process according to claim 1 wherein the temperature $T_2$ is in the range of 135°–185° F.

7. Process according to claim 6 wherein the temperature $T_2$ is in the range of 145° to 155° F.

8. Process according to claim 1 wherein the aqueous alkanolamine solution contains as corrosion inhibitors antimony and vanadium compounds mixed together such that there is a ratio of from about 1 to 9 parts by weight of antimony compound to about 9 to about 1 parts by weight of vanadium compound.

9. Process according to claim 8 wherein the ratio of antimony to vanadium is from about 4–6 parts to about 6–4 parts.

10. Process according to claim 1 wherein the alkanolamine solution contains an inert organic compound.

11. Process according to claim 1 wherein the acid gas loading is about 0.56 m/m.

* * * * *